United States Patent [19]

Takikawa et al.

[11] Patent Number: 5,314,108
[45] Date of Patent: May 24, 1994

[54] METHOD OF PRODUCING WELDED TUBE WITH EXCELLENT CORROSION-RESISTANT INNER SURFACE

[75] Inventors: Kazunori Takikawa, Mumazu; Teruhisa Takahashi, Mishima, both of Japan

[73] Assignee: Usui Kokusai Sangyo Kaisha Limited, Sunto, Japan

[21] Appl. No.: 984,626

[22] Filed: Dec. 2, 1992

[30] Foreign Application Priority Data

Dec. 2, 1991 [JP] Japan .................................. 3-343901

[51] Int. Cl.$^5$ ............................................. B21D 39/00
[52] U.S. Cl. .................................... 228/144; 228/199; 148/521
[58] Field of Search ............... 228/144, 147, 199, 155; 148/519, 521; 138/DIG. 6, 146

[56] References Cited

U.S. PATENT DOCUMENTS

| | | | |
|---|---|---|---|
| 3,827,139 | 8/1974 | Norteman | 228/147 |
| 3,873,799 | 3/1975 | Scheffler | 228/147 |
| 4,082,212 | 4/1978 | Headrick | 228/147 |

FOREIGN PATENT DOCUMENTS

| | | | |
|---|---|---|---|
| 3808728 | 7/1989 | Fed. Rep. of Germany | 228/147 |
| 0130465 | 10/1979 | Japan | 228/155 |
| 0136592 | 10/1980 | Japan | 228/144 |
| 2225654 | 9/1990 | Japan | 228/144 |

*Primary Examiner*—Paula A. Bradley
*Assistant Examiner*—James Miner
*Attorney, Agent, or Firm*—Nikaido, Marmelstein, Murray & Oram

[57] ABSTRACT

Disclosed is a method of producing a welded steel tube with excellent inner surface corrosion resistance, in which at least one surface of a steel strip is coated with a first plate layer made of at least one of nickel, cobalt and alloys based on the metals, the plated steel strip is formed into a welded tube with the plated surface being inside, a film-forming material of at least one of tin and tin-based alloys is inserted into the inside of the welded tube and is then heat-treated at a temperature not lower than the melting point of the film-forming material by passing the tube through a continuous heating furnace having a non-oxidizing gas atmosphere therein so that the film forming material as inserted into the welded tube is fused and spread over the first plate layer to form a second plate layer thereon, and the tube is finally cooled. The welded steel tube of the present invention is free from cracks, pin holes, overplated spots and peeling of the plate layer and therefore has excellent corrosion resistance.

8 Claims, No Drawings

METHOD OF PRODUCING WELDED TUBE WITH EXCELLENT CORROSION-RESISTANT INNER SURFACE

BACKGROUND OF THE INVENTION

1. Field of the Invention

The present invention relates to a method of producing a welded tube with an excellent corrosion-resistant inner surface, in which the inner surface as plated with a metal or alloy has excellent corrosion resistance to be free from corrosion especially that from the welded part (hereinafter referred to as a bead part).

2. Description of the Prior Arts

Heretofore, a small-diameter steel tube has been used as a fuel pipe for cars. As pipes for lower gasoline, sour gasoline, alcohol and alcohol-mixed fuels, formation of an anti-rusting metal layer on the inner surface thereof for improving the rust resistance of it has been proposed. For instance, there has been proposed a method of forming a fused film on the inner surface of a metal tube; in which a film forming material of tin, lead, zinc or an alloy based on the metals is inserted into the inside of a long-size metal tube, the both edges of the metal tube are crushed with leaving a slight air-passing slit therethrough, and the tube is heat-treated at a temperature of from 700° to 1150° C. by passing it through a continuous heating furnace having a non-oxidizing gas atmosphere therein under the condition to thereby form a film over the inner surface of the metal tube by fusion coating (Japanese Patent Publication No. 58-49636).

However, since the proposed method is one to coat one single metal layer or alloy layer on the inner surface of a tube, it has a problem that pin holes or spots not well coated with the layer with due to coating failure, if any, on the coated surface would often be corroded by water to be in alcohol or alcohol-mixed fuel or by organic acids to be formed by oxidation of gasoline or decomposition of alcohol.

SUMMARY OF THE INVENTION

The object of the present invention is to provide a method of producing a welded tube not only having excellent corrosion resistance but also having excellent bending and terminal-forming workability, in which even the bead part is plated and the pin holes of the first plate layer are over-coated.

The present inventors repeatedly studied so as to overcome the above-mentioned problem and to attain the above-mentioned object and have found that the object may be attained when a steel strip is plated to have a first plate layer thereon and formed into a tube and then a film-forming material is inserted into the tube and heat-treated so that the film-forming material is fused and spread to form a second plate layer over the first plate layer. On the basis of the finding, they have completed the present invention. Specifically, the present invention provides a method of producing a welded tube with an excellent corrosion-resistant inner surface, in which a first plate layer made of at least one of nickel, cobalt and alloys based on the metals is formed on at least one surface of a steel strip, the plated strip is then formed into a welded tube with the plated surface being inside, and thereafter a film-forming material comprising at least one of tin and tin-based alloys is inserted into the inside of the welded tube, the tube is then heat-treated at a temperature not lower than the melting point of the film-forming material by passing it through a continuous heating furnace having a non-oxidizing gas atmosphere therein, preferably under the condition that both ends of the welded tube have been crushed leaving a slight air-passing slit therethrough, so that the film-forming material as inserted into the inside of the welded tube is fused and spread to form a second plate layer over the first plate layer, and it is then cooled.

DETAILED DESCRIPTION OF THE INVENTION

The steel strip for use in the present invention may be any material which is generally used as a material for fuel pipes for cars.

The first plate layer is formed to have a thickness of from 0.5 to 10 $\mu$m, using at least one of nickel, cobalt and alloys based on the metals, in accordance with an electric or chemical plating method ordinarily employed for plating of a steel strip. If the thickness of the first plate layer is less than 0.5 $\mu$m, the intended corrosion resistance could not be attained. On the contrary, if it is more than 10 $\mu$m, the layer would often be cracked. In addition, in the latter case, many steps are needed for the plating to be expensive with giving no further additional advantage.

In order to elevate the adhesiveness of the first plate layer to the surface of a steel strip, a subbing plate layer of a metal having high affinity to the first plate layer such as nickel or copper or of an alloy based on the metal may be formed on the surface by strike-plating or the like. In the case, the thickness of the first plate layer is within the range of from 0.5 to 10 $\mu$m, including the thickness of the subbing plate layer; and the thickness of the subbing plate layer of itself is desired to be 1 $\mu$m or less.

Formation of a tube from the thus plated steel strip may be effected by any known process, for example, comprising a roll-forming step of cutting the strip into a desired size followed by rolling it into a tube with the plated surface being inside and a butt seam welding step of welding the butt joint part by electric resistance welding or high frequency welding.

For forming the second plate layer over the previously formed first plate layer, a film-forming material is inserted into the welded tube, which may be at least any material of single metals and alloys selected from the group consisting of tin and tin-base alloys, for example, tin, tin-zinc alloys and tin-nickel alloys. For instance, the material in the form of wire, powder or flakes is inserted into the inside of the welded tube in an amount suitable for the inner surface area of the tube or the desired thickness of the film to be plated and then heat-treated so as to be fused and spread over the first plate layer and over the spots, if any, not coated with the first plate layer to thereby form the intended second plate layer thereover.

The heat treatment is effected by the use of a continuous heating furnace such as a conveyer-type continuous heating furnace, at a temperature not lower than the melting point of the film-forming material, preferably within the range of from 700° to 1500° C. This is because if the heating temperature is lower than the melting point of the film-forming material, the material would neither be fused nor be fluid so that any fused film could not be formed. If the temperature is lower than 700° C., falling without the preferred temperature range, fusion of the film-forming material would be slow and the fluidity of the fused material would be low and therefore the fused film could not be formed efficiently. On the contrary, if it is higher than 1150° C., the mechanical properties of the fused tube of itself would be worsened.

After the film-forming material has been inserted into the inside of the welded tube, it is preferred that the both ends of the tube are crushed each into any desired form of a flat, curved flat or drawn narrowed shape having a slight slit therethrough, for example, by pressing or swaging, to form an air-passing slit through each end, prior to the heat treatment.

As mentioned above, in accordance with the present invention, at least one surface of a steel strip is plated by an ordinary plating method to form a first plate layer of nickel or the like having a determined thickness, the thus plated strip is cut into a desired size, it is shaped into a tube by a roll-forming method or the like with the plated surface being inside, the butt joint part of the tube is welded by electric welding or high frequency welding into to form a welded tube, a film-forming material such as a tin wire is inserted into almost the whole length of the tube, then preferably and optionally the both ends of the tube are crushed, for example, by pressing each to form a slight air-passing slit therethrough, the thus worked tube is passed through a continuous heating furnace having a non-oxidizing gas atmosphere for heat treatment at a temperature not lower than the melting point of the film-forming material, preferably falling within the range of from 700° to 1150° C. so that the film-forming material is fused and spread over the first plate layer and over the spots, if any, not coated with the first plate layer to form a second plate layer thereover, and finally it is spontaneously cooled or, if desired, is cooled by forced cooling from the outside as rapidly as possible to produce a welded tube having an excellent corrosion-resistant inner surface. Accordingly, the above-mentioned problem in the prior art has been overcome by the present invention.

In general, where a tube is formed from a plated steel strip, the bead part of the but joint area is often such that the plated layer is locally lost. As opposed to this, in accordance with the present invention, even though a tube is formed from a steel strip having a first plate layer thereon and the bead part thereof has local spots not coated with the first layer, a film-forming material is inserted into the tube and heated so that the material is fused and spread over the bead part to entirely cover the first plate layer as well as the local spots, if any. In addition, even though the first layer has pin holes or cracks, the film-forming material as fused and spread to form the second plate layer may cover them. Therefore, the inner surface of the welded tube of the present invention is to have the second plate layer made of tin or the like over the first plate layer and, additionally, the interface between the first plate layer and the second plate layer may be a diffused layer from the two layers so that at least the bead part as well as pin holes and cracks, if any, may be coated with the second plate layer due to fusion and spreading of the layer material by capillary action thereof.

The second plate layer is formed by fusion and spreading of the film-forming material due to heat treatment thereof, and the heat treatment is effected in a continuous heating furnace having a non-oxidizing gas atmosphere, preferably after the both ends of the welded tube into which the film-forming material has been inserted are crushed each to have a slight air-passing slit therethrough, whereby a uniform film of the second plate layer is formed. Though not surely believed, the reason is considered because, since a continuous heating furnace generally has a short heating area and therefore a long-size welded tube is to be successively heated from the top thereof in relation to the continuous movement of the tube, the temperature in the inside of the tube being heated is extremely uneven in the direction of the axis thereof so that the temperature in the same direction is to be uneven if the both ends of the tube are not crushed but are open and therefore the air in the inside of the tube moves in the direction of the axis of the tube to the result that not only the inner air would escape from the both ends of the tube but also the external air and the non-oxidizing gas would flow into the inside of the tube. As opposed to this, it may be considered that, since the preceding air-passing slit is formed through each end of the welded tube in the case of the present invention, such disadvantage as mentioned above may be prevented so that formation of any oxide film on the inner surface of the welded tube due to reaction with oxygen as well as formation of any oxide film from the film-forming material may well be prevented and, in particular, retardation of wetting and spreading of the film-forming material over the first plate layer on the welded tube due to the oxide film of the film-forming material may well be prevented to cause good spreading of the film-forming material over the first plate layer Fusion and spreading of the film-forming material as referred to herein means such that the film-forming material is not oxidized but is kept to have a clean surface condition and the material of the condition is heated, fused and vaporized to have a reduced surface tension and is thus spread to well wet over the clean first plate layer of the welded tube.

The present invention will be explained in more detail by way of the following examples, which, however, are not intended to restrict the scope of the present invention.

EXAMPLE 1

Electric nickel plating was effected over a steel strip (JIS G 3141 SPCC) with a known Watt plating bath to form a first nickel layer having a thickness of 3 $\mu$m on the steel.

The thus nickel-plated steel strip was cut into an open width of a tube to be formed and shaped into a tube by a known roll-forming method, and the butt joint part of the tube was welded by electric resistance welding to form a welded tube having an outer diameter of 8 mm.

A tin wire having a diameter of 0.4 mm was inserted into the inside of the welded tube, the both ends of the tube were crushed by pressing each to have a thin air-passing slit therethrough, and the tube was heat-treated in a continuous heating furnace having a non-oxidizing gas atmosphere therein at a temperature of 800° C for 30 seconds. Then, this was taken out from the furnace and spontaneously cooled to produce a welded tube product.

The welded tube thus obtained was cut in the lengthwise direction and the cut section was observed with a microscope. As a result, it was confirmed that the composite plate layer was well formed on the inner surface of the tube also on the bead part thereof and that the interface between the first plate layer and the second plate layer had a diffused layer. The sample was masked except the area to be tested and was subjected to a salt spray test on the basis of JIS Z 2371. As a result, no red rust formed on the inner surface of the tube even after 72 hours. Thus, the tube was admitted to have excellent corrosion resistance. In addition, it was also subjected to a bending test of bending it to 180 degrees at a radius of 20 mm with a grooved roll and to a press working test of pressing the terminals of it for evaluation of the workability thereof, whereupon the plate layer neither cracked nor peeled.

EXAMPLE 2

In the same manner as in Example 1, formed was a welded tube with an outer diameter of 10 mm, having a first nickel plate layer with a thickness of 4 μm. A tin-zinc alloy having a diameter of 0.4 mm was inserted into the tube and heat-treated at 1150° C. for one minute to obtain a welded tube produce, also in the same manner as in Example 1.

The welded tube product thus obtained was subjected to the same tests as in Example 1 to the result that no rust formed even after 48 hours. In the same bending test and evaluation test, the plate layer neither cracked nor peeled.

EXAMPLE 3

Using a known copper cyanide plating bath, a strike copper plate layer having a thickness of 0.5 μm was formed, as a subbing plate layer, on a steel strip of the same kind as that used in Example 1, by electric plating. Then, using a plating bath comprising 22 g/liter of $CoCl_2.7H_2O$, 105 g/liter of $N_2H_6Cl_2$ and 90 g/liter of $C_4H_4O_6Na_2.2H_2O$, a first cobalt plate layer having a thickness of 1 μm was formed over the subbing plate layer by chemical plating. This was then formed into a welded tube having an outer diameter of 6.35 mm in the same manner as in Example 1. A tin wire having a diameter of 0.3 mm was inserted into the tube and heat-treated at 950° C. to obtain a welded tube product also in the same manner as in Example 1.

The welded tube product thus obtained was subjected to the same tests as in Example 1 to the result that no rust formed even after 72 hours. In the same bending test and evaluation test, the plate layer neither cracked nor peeled.

EXAMPLE 4

Using a plating bath comprising 28 g/liter of $SnCl_2.6H_2O$, 30 g/liter of $NiCl_2.6H_2O$, 200 g/liter of $K_4P_2O_7$, 20 g/liter of glycine and 5 ml/liter of concentrated aqueous ammonia, a first tin-nickel alloy plate layer having a thickness of 10 μm was formed on a steel strip of the same kind as that used in Example 1, by electric plating. This was then formed into a welded tube having an outer diameter of 8 mm, and a tin-zinc alloy wire having a diameter of 0.5 mm was inserted into the tube and heat-treated at 700° C. for 30 seconds to form a welded tube product, in the same manner as in Example 1.

The welded tube product thus obtained was subjected to the same tests as in Example 1 to the result that no rust formed even after 48 hours. In the same bending test and evaluation test, the plate layer neither cracked nor peeled.

EXAMPLE 5

Using a plating bath comprising 260 g/liter of $NiCl_2.6H_2O$, 14 g/liter of $CoCl_2.6H_2O$ and 15 g/liter of $H_3BO_3$, a first nickel-cobalt alloy plate layer having a thickness of 2 μm was formed on a steel strip of the same kind as that used in Example 1, by electric plating. Then, this was formed into a welded tube having an outer diameter of 10 mm in the same manner as in Example 1, and a tin wire having a diameter of 0.6 mm was inserted into the tube and heat-treated at 1000° C. for 15 seconds to obtain a welded tube product also in the same manner as in Example 1.

The welded tube product thus obtained was subjected to the same tests as in Example 1 to the result that no rust formed even after 48 hours. In the same bending test and evaluation test, the plate layer neither cracked nor peeled.

COMPARATIVE EXAMPLE 1

A steel strip of the same kind as that used in Example 1 was processed in the same manner as in Example 1, except that the first plate layer was not formed and that the heat-treatment at 1000° C. for 15 seconds was not effected, to obtain a welded tube product having a tin plate layer formed on the inner surface thereof.

The welded tube product thus obtained was subjected to the same tests as in Example 1 to the result that the product rusted in 12 hours in the salt spray test though the plate layer of it neither cracked nor peeled in the bending test and evaluation test.

COMPARATIVE EXAMPLE 2

A nickel plate layer having a thickness of 3 μm was formed on a steel strip of the same kind as that used in Example 1 in the same manner as in Example 1, and the plated strip was formed into a welded tube also in the same manner as in Example 1. This was heat-treated at 900° C. for 30 seconds to produce a welded tube product.

This was subjected to the same tests as in Example 1 to the result that the bead part of the product was not fully coated with the nickel plate layer and that it rusted in 0.5 hour in the salt spray test.

COMPARATIVE EXAMPLE 3

A nickel-cobalt alloy plate layer having a thickness of 15 μm was formed on a steel strip of the same kind as that used in Example 5 in the same manner as in Example 1, and the plated strip was formed into a welded tube in the same manner as in Example 1. This was heat-treated at 1100° C. for 4 minutes to produce a welded tube product.

This was subjected to the same tests as in Example 1 to the result that the product cracked and peeled in the bending test and evaluation test though it did not rust even in 4 hours in the salt spray test.

In accordance with the present invention, as explained in detail in the above, a first plate layer is formed on a steel strip, then the plated strip is cut into a determined width and formed into a welded tube, and a film-forming material is inserted into the tube and heat-treated to so that it is fused and spread over the first plate layer of the welded tube. Accordingly, a composite plate layer may simply and uniformly be formed on the inner surface of the tube with exposing no steel base of the tube out of the layer. Thus, the welded tube produced by the present invention is free from cracks, pin holes, overplated spots and peeling of the plate layer and therefore has excellent corrosion resistance. Additionally, this has excellent workability for working the terminals. The advantages of the present invention are thus noticeable.

While the invention has been described in detail and with reference to specific embodiments thereof, it will be apparent to one skilled in the art that various changes and modifications can be made therein without departing from the spirit and scope thereof.

What is claimed is:

1. A method of producing a welded tube with an excellent corrosion-resistant inner surface, in which at least one surface of a steel strip is coated with a first plate layer made of at least one selected from nickel, cobalt and alloys based on nickels and cobalt, the plated steel strip is formed into a welded tube with the plated surface being inside, a film-forming material of at least one selected from tin and tin-based alloys is inserted into the inside of the welded tube and the tube is then heat-treated at a temperature not lower than the melting point of the film-forming material by passing the tube through a continuous heating furnace having a non-oxidizing gas atmosphere therein so that the film-forming material as inserted into the welded tube is fused and spread over the first plate layer to form a second plate layer thereon, and the tube is finally cooled.

2. The method of producing a welded tube as claimed in claim 1, in which, after the film-forming material has been inserted into the inside of the welded tube, both ends of the tube are worked each to have a slight air-passing slit therethrough prior to the heat treatment.

3. The method of producing a welded tube as claimed in claim 1, in which the first plate layer has a thickness of from 0.5 to 10 μm.

4. The method of producing a welded tube as claimed in claim 3, in which a subbing plate layer of a metal having good affinity with the first plate layer is previously formed prior to the plating of the first plate layer.

5. The method of producing a welded tube as claimed in claim 4, in which the total thickness of the first plate layer and the subbing plate layer is from 0.5 to 10 μm and the single thickness of the subbing plate layer only is 1 μm or less.

6. The method of producing a welded tube as claimed in claim 1, in which the film-forming material is a powdery or flaky material.

7. The method of producing a welded tube as claimed in claim 1, in which the heat treatment is effected at a temperature falling within the range of from 700° to 1500° C.

8. The method of producing a welded tube as claimed in claim 1, in which, after the film-forming material has been inserted into the inside of the welded tube, the both ends of the tube are crushed each to have a slight air-passing slit therethrough prior to the heat treatment.

* * * * *